(12) United States Patent
Jeon et al.

(10) Patent No.: US 10,501,079 B2
(45) Date of Patent: Dec. 10, 2019

(54) VEHICLE DRIVING CONTROL APPARATUS AND METHOD THEREOF

(71) Applicants: HYUNDAI MOTOR COMPANY, Seoul (KR); KIA MOTORS CORPORATION, Seoul (KR)

(72) Inventors: Byeong Wook Jeon, Seoul (KR); Sangjun Park, Seoul (KR); Kwang Hee Park, Suwon-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 53 days.

(21) Appl. No.: 15/834,840

(22) Filed: Dec. 7, 2017

(65) Prior Publication Data

US 2018/0290654 A1    Oct. 11, 2018

(30) Foreign Application Priority Data

Apr. 7, 2017    (KR) .......................... 10-2017-0045216

(51) Int. Cl.
*B60W 30/18*    (2012.01)

(52) U.S. Cl.
CPC ................. *B60W 30/18072* (2013.01); *B60W 2510/0208* (2013.01); *B60W 2520/105* (2013.01); *B60W 2540/10* (2013.01); *B60W 2540/12* (2013.01); *B60W 2550/22* (2013.01); *B60W 2710/021* (2013.01)

(58) Field of Classification Search
CPC ... B60W 30/18072; B60W 2510/0208; B60W 2520/105; B60W 2540/10; B60W 2540/12; B60W 2550/20; B60W 2550/22; B60W 2710/021; B60W 30/18
See application file for complete search history.

(56) References Cited

U.S. PATENT DOCUMENTS

2014/0156171 A1\* 6/2014 Kono .................... B60W 10/02
701/103

FOREIGN PATENT DOCUMENTS

| JP | 4760517 B2 | 8/2011 |
| KR | 10-2016-0056715 | 5/2016 |
| KR | 10-2016-0114370 | 10/2016 |

\* cited by examiner

*Primary Examiner* — Huan Le
(74) *Attorney, Agent, or Firm* — Brinks Gilson & Lione (57) ABSTRACT

The present disclosure provides a vehicle driving control apparatus and a method. The apparatus includes an engine configured to generate a power; a clutch positioned between the engine and a transmission and configured to selectively connect the engine and the transmission; a state detector configured to detect state data to control a driving of a vehicle; and a controller configured to determine a stopping line based on a difference between the vehicle and a stopping line when an entry condition is satisfied based on the state data, determine whether a driving control condition is satisfied based on a lighting color of a traffic signal light positioned at the stopping line and the stopping line distance, confirm a deceleration rate depending on a clutch engagement when the driving control condition is satisfied, and control a clutch to decelerate a vehicle speed based on a stop prediction position depending on the deceleration rate.

14 Claims, 5 Drawing Sheets

VEHICLE DRIVING CONTROL APPARATUS AND METHOD THEREOF

CROSS-REFERENCE TO RELATED APPLICATION

The present application claims priority to and the benefit of Korean Patent Application No. 10-2017-0045216, filed on Apr. 7, 2017, which is incorporated herein by reference in its entirety.

FIELD

The present disclosure relates to a vehicle driving control apparatus and a method thereof, in detail, relates to a vehicle driving control apparatus and a method thereof for controlling a driving of the vehicle by determining a position of the vehicle and a lighting state of a traffic signal light.

BACKGROUND

The statements in this section merely provide background information related to the present disclosure and may not constitute prior art.

A traffic signal light is provided for a vehicle operation and a pedestrian safety.

This traffic signal light is installed at an intersection etc., and a lamp indicating a traveling and stopping for a straight road may be provided. A lamp for instructing a left or right turn etc. may also be provided in accordance with a road condition. The traffic signal light instructs the traveling in a certain direction of the vehicle through the lighted lamp by periodically turning the lamp on or off.

Generally, when the red light turns on during the traveling of the vehicle, the vehicle coasts until the driver disengages his foot on the accelerator pedal and steps on the brake pedal.

However, if an engine brake causes a vehicle deceleration more than a driver's expectation during the coasting, the driver has to take more of the accelerator pedal to move the vehicle to traffic signal light. In order to inhibit this, when operating a coasting mode of an automatic transmission, if the distance to the traffic signal light is short, as the deceleration becomes delayed, the driver must carry out a sudden braking operation.

The above information disclosed in this section is only for enhancement of understanding of the background of the disclosure and therefore it may contain information that does not form the prior art that is already known in this country to a person of ordinary skill in the art.

SUMMARY

The present disclosure provides a vehicle driving control apparatus and a method thereof for controlling the deceleration of the vehicle by determining the position of the vehicle and the lighting condition of the traffic signal light.

Also, the present disclosure provides the vehicle driving control apparatus and the method thereof for controlling the coasting mode and a clutch depending on the lighting condition of the traffic signal light and the distance to a stopping line in conjunction with a route guidance device.

A vehicle driving control apparatus in one form of the present disclosure includes an engine configured to generating a power; a clutch positioned between the engine and a transmission and configured to selectively connect the engine and the transmission; a state detector configured to detect state data to control a driving of a vehicle; and a controller configured to determine a stopping line distance based on a difference between the vehicle and a stopping line when an entry condition is satisfied based on the state data, determine whether a driving control condition is satisfied based on a lighting color of a traffic signal light positioned at the stopping line and the stopping line distance, confirm a deceleration rate depending on a clutch engagement when the driving control condition is satisfied, and control a clutch to decelerate a vehicle speed based on a stop prediction position that depends on the deceleration rate.

The controller may be configured to confirm a first deceleration rate when the clutch is engaged, determine a first stop prediction position based on on the first deceleration rate, confirm a second deceleration rate when the clutch is disengaged, and determine a second stop prediction position based on the second deceleration rate.

The controller may be configured to engage the clutch to decelerate the vehicle speed when the first stop prediction position is a first predetermined position, wherein the first predetermined position is a position that a front portion of the vehicle is on the stopping line position or crosses the stopping line.

The controller may be configured to determine whether the second stop prediction position is a second predetermined position when the first stop prediction position is the second predetermined position, wherein the second predetermined position is a position that the front portion of the vehicle is not on the stopping line and does not cross the stopping line, and disengage the clutch to decelerate the vehicle speed when the second stop prediction position is the second predetermined position.

The controller may be configured to determine whether the second stop prediction position is the second predetermined position when the first stop prediction position is the second predetermined position, disengage the clutch to decelerate the vehicle speed when the second stop prediction position is the first predetermined position, determine whether the vehicle reaches the stopping line with the first deceleration rate when the vehicle speed is decelerated, and engage the clutch to decelerate the vehicle speed when the vehicle reaches the stopping line with the first deceleration rate.

The controller may be configured to receive lighting color information from a traffic information device, determine whether the stopping line distance is within a predetermined distance when the lighting color of the traffic signal light is red based on the lighting color information, and determine that the driving control condition is satisfied when the stopping line distance is within the predetermined distance.

The controller may be configured to determine that the entry condition is satisfied when a position value of an accelerator pedal is a first predetermined value and a position value of a brake pedal is a second predetermined value.

The state detector may include at least one of a speed detecting unit configured to detect the vehicle speed; an accelerator pedal position sensor configured to detect the position value of the accelerator pedal; or a brake pedal position sensor configured to detect the position value of the brake pedal.

A vehicle driving control method in another form of the present disclosure includes determining whether an entry condition is satisfied based on state data; determining a stopping line distance based on a difference between a vehicle and a stopping line when the entry condition is satisfied; determining whether a lighting color of a traffic signal light positioned at the stopping line is red; determining whether the stopping line distance is within a predetermined distance when the lighting color of the traffic signal light is red; confirming a deceleration rate depending on a clutch engagement when the stopping line distance is within the predetermined distance and determining a stop prediction position based on the deceleration rate; and controlling a clutch based on the stop prediction position.

Determining the stop prediction position may include determining a first stop prediction position based on the first deceleration rate when the clutch is engaged; and determining a second stop prediction position based on the second deceleration rate when the clutch is disengaged.

Controlling the clutch may include determining whether the first stop prediction position is a first predetermined position; and engaging the clutch to decelerate a vehicle speed when the first stop prediction position is the first predetermined position, wherein the first predetermined position is a position that a front portion of the vehicle is on the stopping line or crosses the stopping line.

Controlling the clutch may include determining whether the second stop prediction position is a second predetermined position when the first stop prediction position is the second predetermined position; and disengaging the clutch to decelerate the vehicle speed when the second stop prediction position is the second predetermined position, wherein the second predetermined position is a position that the front portion of the vehicle is not on the stopping line and does not cross the stopping line.

Controlling the clutch may include determining whether the second stop prediction position is the second predetermined position when the first stop prediction position is the second predetermined position; disengaging the clutch to decelerate the vehicle speed when the second stop prediction position is the first predetermined position; determining whether the vehicle reaches the stopping line with the first deceleration rate when the vehicle speed is decelerated; and engaging the clutch to decelerate the vehicle speed when the vehicle reaches the stopping line with the first deceleration rate.

Determining the stopping line distance may include receiving road guidance information from a route guidance device; and determining the stopping line distance based on a vehicle position by using the road guidance information.

Determining whether the lighting color of the traffic signal light is red may include receiving lighting color information from a traffic information device; and determining whether the lighting color of the traffic signal light is red based on the lighting color information, Determining whether the entry condition is satisfied may include determining whether a position value of an accelerator pedal is a first predetermined value, and a position value of a brake pedal is a second predetermined value.

In some forms of the present disclosure, the deceleration of the vehicle may be controlled by determining the position of the vehicle and the lighting condition of the traffic signal light, thereby improving the comfortability of the driver.

Also, the coasting mode and the clutch may be controlled depending on the lighting condition of the traffic signal light and the distance to the stopping line in conjunction with the route guidance device, thereby improving the fuel consumption.

Other effects that may be obtained or predicted from some forms of the present disclosure will be explicitly or implicitly disclosed in the detailed description of the exemplary forms of the present disclosure. That is, various effects predicted in some forms of the present disclosure will be disclosed in the detailed description to be described below.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DESCRIPTION OF SYMBOLS

100: route guidance device
140: Traffic signal light
150: Traffic information device
200: driving control apparatus
210: state detector
230: engine
240: clutch
250: transmission
260: controller

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an operation principle for a vehicle driving control apparatus and a method thereof in some forms of the present disclosure will be described with reference accompanying drawings. However, the drawings to be described below and the following detailed description relate to one preferred exemplary form of various exemplary forms for effectively explaining the characteristics of the present disclosure. Therefore, the present disclosure should not be construed as being limited to the drawings and the following description.

Further, in the description of some forms of the present disclosure, the detailed description of related well-known configurations and functions is not provided, when it is determined as unnecessarily making the scope of the present disclosure unclear. Further, the terminologies to be described below are ones defined in consideration of their function in the present disclosure, and may be changed by the intention of a user, an operator, or a custom. Therefore, their definitions should be determined on the basis of the description of the present disclosure.

In addition, in the following exemplary forms, the terminologies are appropriately changed, combined, or divided so that those skilled in the art can clearly understand them, in order to efficiently explain the main technical characteristics of the present disclosure, but the present disclosure is not limited thereto.

Hereinafter, some forms of the present disclosure will be described in detail with reference to the accompanying drawings.

Figure 1:
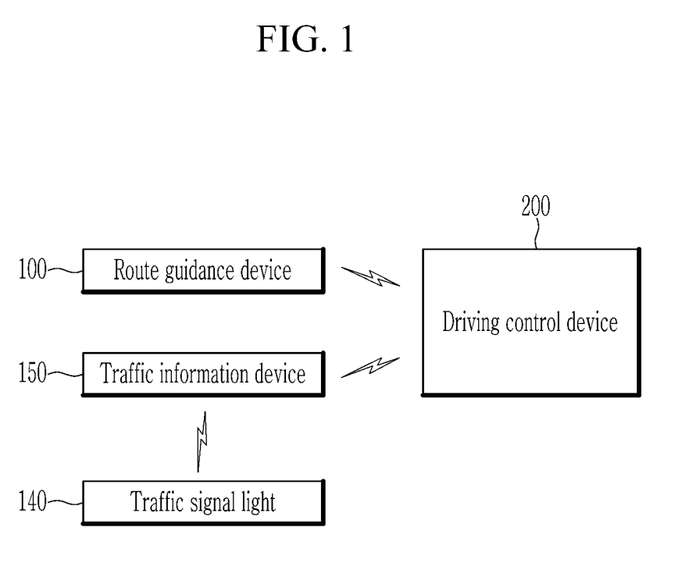
FIG. 1 is a view showing a driving system including a vehicle driving control apparatus.

FIG. 1 is a view showing a driving system including a vehicle driving control apparatus in some forms of the present disclosure.

Referring to FIG. 1, a driving system includes a route guidance device 100, a traffic signal light 140, a traffic information device 150, and a driving control apparatus 200.

The route guidance device 100 may guide a road guidance information such as a speed limitation, a bump to the driver. The route guidance device 100 may generate a route guidance information based on a departure and a destination if the destination is received from the driver and may guide the route to the destination to the driver based on the generated route guidance information.

The route guidance device 100 is connected to the driving control apparatus 200 to transmit and receive data. That is, the route guidance device 100 transmits the road guidance information to the driving control apparatus 200.

The route guidance device 100 may be disposed inside the vehicle or may be configured as a separate device.

If the route guidance device 100 device 100 provides the road guidance information to the driver, its type is irrelevant. For example, the route guidance device 100 may be one among a mobile communication terminal, a tablet PC, a laptop, a movable computer such as a netbook, an audio video navigation (AVN), etc.

The traffic signal light 140 is installed at an intersection etc., a lamp indicating a traveling and stopping for a straight road, and a lamp for instructing a left or right turn etc. may be provided in accordance with a road condition.

The traffic information device 150 transmits a lighting color information of the traffic signal light 140 to the driving control apparatus 200 of the vehicle. Here, the lighting color information may include a color of the lamp of the traffic signal light 140 to be lighted. The traffic information device 150 may be a telematics device.

The driving control apparatus 200 controls the deceleration of the vehicle according to the lighting color information of the traffic signal light 140, thereby improving the comfortability of the driver.

For this, the driving control apparatus 200 receives the lighting color information from the traffic information device 150 and confirms a lighting color of the traffic signal light 140 positioned at a stopping line in the direction in which the vehicle is in progress based on the lighting color information.

The driving control apparatus 200 confirms a deceleration rate according to the engagement of the clutch 240 if the lighting color of the traffic signal light 140 is red and a stopping line distance as a difference of the vehicle and the stopping line is positioned within a predetermined distance.

The driving control apparatus 200 determines a stop prediction position according to the deceleration rate and the clutch 240 and the coasting mode based on the stop prediction position to decelerate the speed of the vehicle.

The driving control apparatus 200 is described in detail with reference to FIG. 2.

Figure 2:
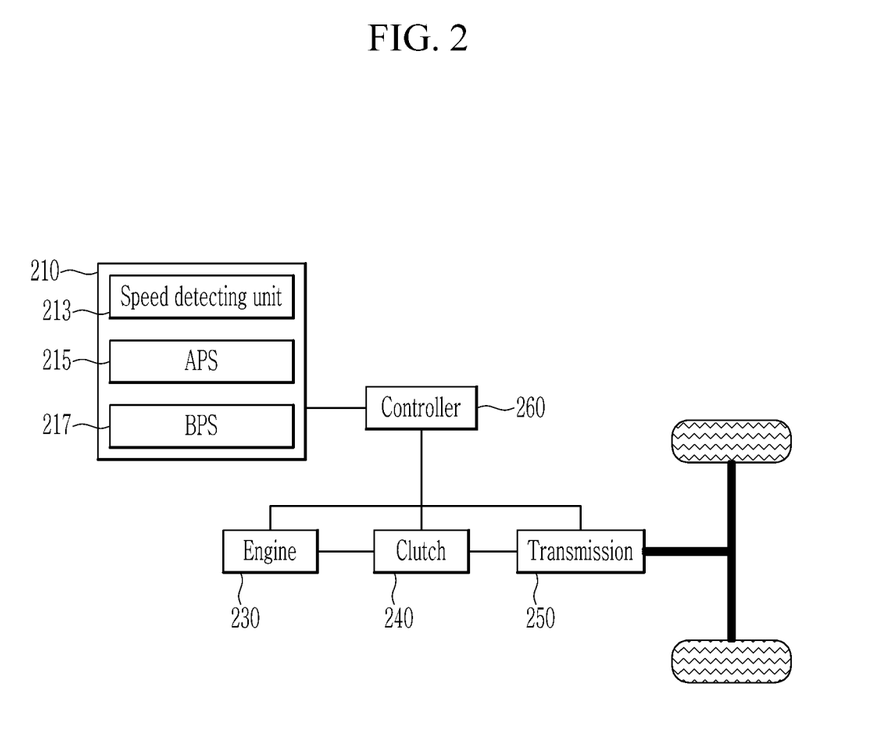
FIG. 2 is a view showing a vehicle driving control apparatus.

FIG. 2 is a view showing a vehicle driving control apparatus in some forms of the present disclosure.

Referring to FIG. 2, the vehicle driving control apparatus 200 includes a state detector 210, an engine 230, a clutch 240, a transmission 250, and a controller 260.

The state detector 210 detects a state data to control the driving of the vehicle. For this, the state detector 210 includes a speed detecting unit 213, an accelerator position sensor (hereinafter referred to as 'APS', 215), and a brake position sensor (hereinafter referred to as 'BPS', 217).

The speed detecting unit 213 detects the speed of the vehicle and provides the detected vehicle speed to the controller 260.

The speed detecting unit 213 may be mounted on a driving wheel of the vehicle. On the other hand, when the speed detecting unit 213 is not provided, the controller 260 may calculate the vehicle speed by using a GPS signal received from the route guidance device 100.

The APS 215 measures how much a driver presses an accelerator pedal. That is, the APS 215 measures a position value of an accelerator pedal (a pushed degree of the accelerator pedal), and transmits a signal corresponding thereto to the vehicle controller 260. When the accelerator pedal is pushed completely, the position value of the accelerator pedal is 100%, and when the accelerator pedal is not pushed, the position value of the accelerator pedal is 0%. Instead of the APS 215, a throttle valve opening detecting unit of a throttle valve mounted to an intake passage may be used.

The BPS 217 measures how much the driver presses a brake pedal. That is, the BPS 217 measures a position value of the brake pedal (a pushed degree of the brake pedal), and transmits a signal corresponding thereto to the vehicle controller 260. When the brake pedal is pushed completely, the position value of the brake pedal is 100%, and when the brake pedal is not pushed, the position value of the accelerator pedal is 0%.

The engine 230 combusts fuel to generate power. That is, the engine 230 may use disclosed various engines such as a gasoline engine using conventional fossil fuel or a diesel engine.

The rotation power generated from the engine 230 is transmitted to the transmission 250 side.

The clutch 240 is disposed between the engine 230 and the transmission 250. The clutch 240 selects connects the engine 230 and the transmission 250. That is, if the clutch 240 is disengaged, the engine 230 may not provide the power to the transmission 250, if the clutch 240 is engaged, the engine 230 may provide the power to the transmission 250.

The transmission 250 selectively receives an output torque of the engine 230 according to the engagement and the disengagement of the clutch 240. The transmission 250 outputs the driving torque to a driving wheel as an arbitrary gear stage is selected according to the vehicle speed and the driving condition, thereby maintaining the driving.

The controller 260 controls the overall operation of the vehicle. The controller 260 controls the output torque of the engine 230 to control the vehicle to be driven.

The controller 260 receives a state data from the state detector 210. The controller 260 determines whether an entry condition is satisfied based on the state data.

If the entry condition is satisfied, the controller 260 determines the stopping line distance representing a difference of the vehicle and the stopping line.

The controller 260 determines whether a driving control condition is satisfied based on the lighting color information and the stopping line distance of the traffic information device 150. In other words, the controller 260 receives the lighting color information from the traffic information device 150 and confirms the lighting color of the traffic signal light 140 based on the lighting color information. If the lighting color of the traffic signal light 140 is red, the controller 260 determines whether the stopping line distance is positioned within the predetermined distance. The controller 260 determines that the driving control condition is satisfied if the stopping line distance is positioned within the predetermined distance.

The controller 260 confirms the deceleration rate depending on the engagement or not of the clutch 240 if the driving control condition is satisfied, determines the stop prediction position depending on the deceleration rate, and controls the clutch 240 and the coasting mode based on the stop prediction position.

The control unit 260 may be implemented with one or more microprocessors executed by a predetermined program. The predetermined program may include a series of commands for performing each step included in a vehicle driving control method in some forms of the present disclosure to be described below. This vehicle driving control method is described in detail with reference to FIGS. 3A, 3B and FIG. 4.

Next, the vehicle driving control method is described in detail with reference to FIGS. 3A, 3B and FIG. 4.

Figure 3A:
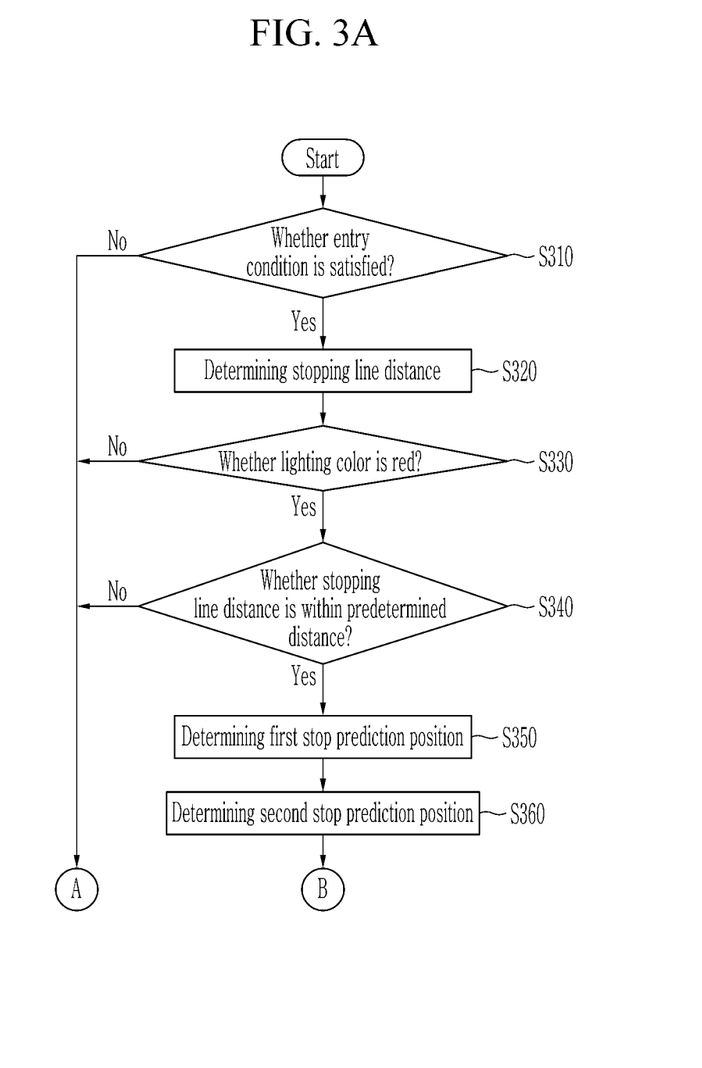
FIGS. 3A and 3B are flowcharts showing a vehicle driving control method.
Figure 3B:
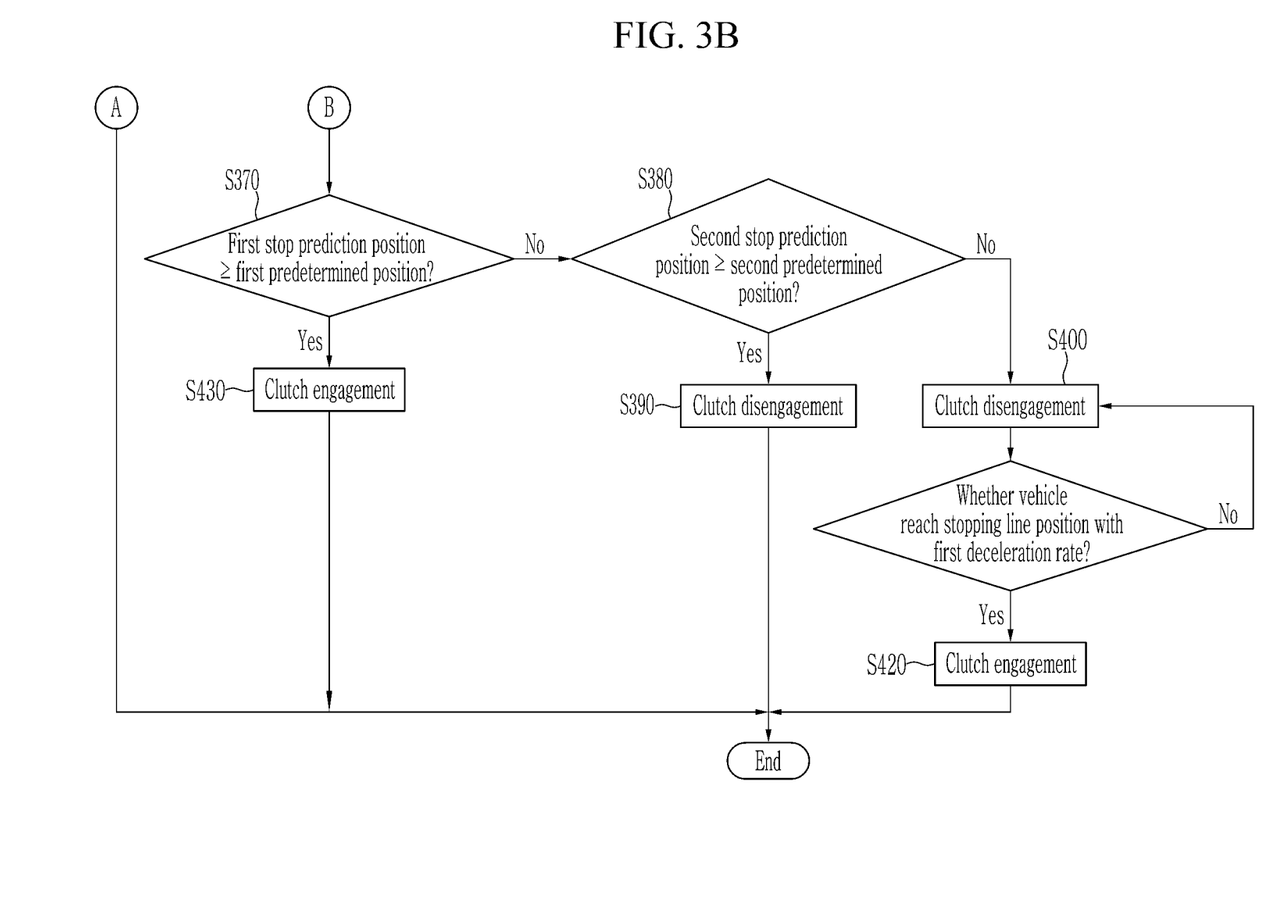
Figure 4:
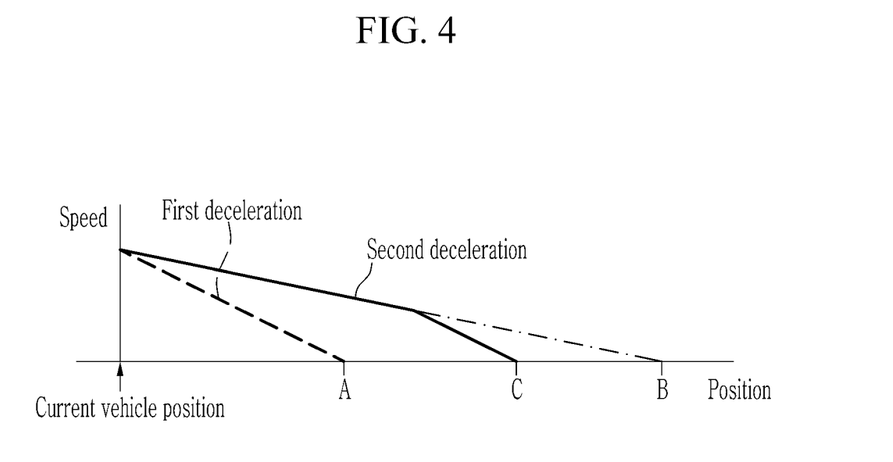
FIG. 4 is a diagram illustrating an example of a vehicle driving control method.

FIGS. 3A and 3B are flowcharts showing a vehicle driving control method in some forms of the present disclosure and FIG. 4 is a diagram illustrating an example of a vehicle driving control method in some forms of the present disclosure.

The controller 260 determines whether the entry condition is satisfied based on the state data (S310). In other words, the controller 260 determines whether the position value of the accelerator pedal included in the state data is a first predetermined value. In this case, the first predetermined value may be 0% as a reference value to determine whether it is a coasting. Also, if the position value of the accelerator pedal is the first predetermined value, the controller 260 determines whether the position value of the brake pedal is a second predetermined value. In this case, the second predetermined value may be 0% as a reference value to determine whether it is a coasting.

The controller 260 may determine that the entry condition is satisfied if the position value of the accelerator pedal is the first predetermined value and the position value of the brake pedal is the second predetermined value.

The controller 260 determines the stopping line distance as the difference of the vehicle and the stopping line if the entry condition is satisfied (S320). In other words, the controller 260 confirms the position of the vehicle if the entry condition is satisfied. In this case, the controller 260 may confirm the position of the vehicle through the GPS signal provided from the route guidance device 100.

The controller 260 receives the road guidance information from the route guidance device 100. The controller 260 determines the stopping line distance based on the vehicle position by using the road guidance information. Here, the stopping line may be the stopping line positioned at the direction that the vehicle is traveled. The stopping line distance may represent the distance from the vehicle to the stopping line.

The controller 260 determines whether the lighting color of the traffic signal light 140 is red (S330). In other words, the controller 260 receives the lighting color information from the traffic information device 150. The controller 260 determines whether the lighting color of the traffic signal light 140 positioned at the stopping line is red based on the lighting color information.

If the lighting color of the traffic signal light 140 is red, the controller 260 determines whether the stopping line distance is positioned within the predetermined distance (S340). In this case, the predetermined distance may be a predetermined value as a distance predetermined to decelerate the vehicle.

If the stopping line distance is within the predetermined distance, the controller 260 determines the first stop prediction position when the clutch 240 is engaged (S350). In detail, if the stopping line distance is positioned within the predetermined distance, the controller 260 confirms the first deceleration rate when the clutch 240 is engaged. In this case, the first deceleration rate represents the deceleration rate when the clutch 240 is engaged and may be the predetermined value.

The controller 260 determines the first stop prediction position depending on the first deceleration rate. That is, the controller 260 determines the first stop prediction position by using the first deceleration rate and the vehicle position. In this case, the first stop prediction position is to predict the position of the vehicle to be stopped when clutch 240 is engaged. For example, the first stop prediction position may be represented like A of FIG. 4.

The controller 260 determines the second stop prediction position when the clutch 240 is disengaged (S360). In detail, the controller 260 confirms the second deceleration rate when the clutch 240 is disengaged. In this case, the second deceleration rate represents the deceleration rate when the clutch 240 is disengaged and may be the predetermined value.

The controller 260 determines the second stop prediction position depending on the second deceleration rate. That is, the controller 260 determines the second stop prediction position by using the second deceleration rate and the vehicle position. In this case, the second stop prediction position is to predict the position of the vehicle to be stopped when the clutch 240 is disengaged. For example, the second stop prediction position may be represented like B of FIG. 4.

The controller 260 determines whether the first stop prediction position is a first predetermined position, which is a position that a front portion of the vehicle is on the stopping line or crosses the stopping line (S370). In this case, the stopping line position may represent the position of the stopping line and may be confirmed through the road guidance information. For example, the stopping line position may be represented like C of FIG. 4.

If the first stop prediction position is the first predetermined position, the controller 260 engages the clutch 240 (S430). That is, if the first stop prediction position is the first predetermined position, the controller 260 disengages the coasting mode and engages the clutch 240 to decelerate the speed of the vehicle into the first deceleration rate.

The controller 260 determines whether the second stop prediction position is a second predetermined position, which is a position that the front portion of the vehicle is not on the stopping line and does not cross the stopping line if the first stop prediction position is the second predetermined position (S380).

The controller 260 disengages the clutch 240 if the second stop prediction position is the second predetermined position (S390). That is, if the second stop prediction position is the second predetermined position, the controller 260 disengages the clutch 240 to change a gearshift of the transmission 250 into a N speed and then decelerates the speed of the vehicle into the second deceleration rate.

In the step (S380), if the second stop prediction position is the first predetermined position, the controller 260 disengages the clutch 240 (S400). That is, if the second stop prediction position is the second predetermined position, the controller 260 disengages the clutch 240 to decelerate the speed of the vehicle into the second deceleration rate.

In the step (S400), during the speed of the vehicle is decelerated into the second deceleration rate, the controller 260 determines whether the vehicle reaches the stopping line with the first deceleration rate (S410).

In the step (S410), if the vehicle may not reach the stopping line with the first deceleration rate, the controller 260 continually decelerates the speed of the vehicle with the second deceleration rate (S400).

In the step (S410), if the vehicle may not reach the stopping line with the first deceleration rate, the controller 260 engages the clutch 240 (S420). That is, the controller 260 engages the clutch 240 to decelerate the speed of the vehicle with the second deceleration rate.

For example, as shown in FIG. 4, if the first stop prediction position is equal to A, the second stop prediction position is equal to B, and the stopping line position is equal to C, the controller 260 may disengage the clutch 240 from the current position of the vehicle to the positioned A to decelerate the speed of the vehicle, if the position of the vehicle passes the position A, the controller 260 may engage the clutch 240 to decelerate the speed of the vehicle.

Also, if the second stop prediction position is the stopping line position or less, the controller 260 operates the coasting mode, disengages the clutch 240, and controls the transmission 250 to change the gearshift into the N speed, and then decelerates the speed of the vehicle.

On the other hand, if the entry condition is satisfied, the lighting color of the traffic signal light 140 is not red, and the stopping line distance is not existed within the predetermined distance, the controller 260 engages the clutch 240 to control the vehicle (S430). That is, the controller 260 engages the clutch 240 to provide the power of the engine 230 to the transmission 250 and controls the transmission 250 depending on the requirements of the driver to drive the vehicle.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle driving control apparatus comprising:
   an engine configured to generate a power;
   a clutch positioned between the engine and a transmission and configured to selectively connect the engine and the transmission;
   a state detector configured to detect state data to control a driving of a vehicle; and
   a controller configured to:
      determine a stopping line distance based on a difference between the vehicle and a stopping line when an entry condition is satisfied based on the state data;
      determine whether a driving control condition is satisfied based on a lighting color of a traffic signal light positioned at the stopping line and based on the stopping line distance;
      confirm a deceleration rate depending on a clutch engagement when the driving control condition is satisfied;
      control the clutch based on a stop prediction position that depends on the deceleration rate to decelerate a vehicle speed;
      confirm a first deceleration rate when the clutch is engaged;
      determine a first stop prediction position based on the first deceleration rate;
      confirm a second deceleration rate when the clutch is disengaged; and
      determine a second stop prediction position based on the second deceleration rate.

2. The vehicle driving control apparatus of claim 1, wherein:
   the controller is configured to engage the clutch to decelerate the vehicle speed when the first stop prediction position is a first predetermined position, wherein the first predetermined position is a position that a front portion of the vehicle is on the stopping line or crosses the stopping line.

3. The vehicle driving control apparatus of claim 1, wherein the controller is configured to:
   determine whether the second stop prediction position is a second predetermined position when the first stop prediction position is the second predetermined position, wherein the second predetermined position is a position that a front portion of the vehicle is not on the stopping line and does not cross the stopping line; and
   disengage the clutch to decelerate the vehicle speed when the second stop prediction position is the second predetermined position.

4. The vehicle driving control apparatus of claim 1, wherein the controller is configured to:
   determine whether the second stop prediction position is a second predetermined position when the first stop prediction position is the second predetermined position;
   disengage the clutch to decelerate the vehicle when the second stop prediction position is a first predetermined position;
   determine whether the vehicle reaches the stopping line with the first deceleration rate when the vehicle speed is decelerated; and
   engage the clutch to decelerate the vehicle speed when the vehicle reaches the stopping line with the first deceleration rate.

5. The vehicle driving control apparatus of claim 1, wherein the controller is configured to:
   receive lighting color information from a traffic information device;
   determine whether the stopping line distance is within a predetermined distance when the lighting color of the traffic signal light is red based on the lighting color information; and
   determine that the driving control condition is satisfied when the stopping line distance is within the predetermined distance.

6. The vehicle driving control apparatus of claim 1, wherein:
   the controller is configured to determine that the entry condition is satisfied when a position value of an accelerator pedal is a first predetermined value and a position value of a brake pedal is a second predetermined value.

7. The vehicle driving control apparatus of claim 1, wherein the state detector comprises at least one of:
   a speed detecting unit configured to detect the vehicle speed;
   an accelerator pedal position sensor configured to detect a position value of the accelerator pedal; or a brake pedal position sensor configured to detect a position value of the brake pedal.

8. A vehicle driving control method comprising:
determining whether an entry condition is satisfied based on state data;
determining a stopping line distance based on a difference between a vehicle and a stopping line when the entry condition is satisfied;
determining whether a lighting color of a traffic signal light positioned at the stopping line is red;
determining whether the stopping line distance is within a predetermined distance when the lighting color of the traffic signal light is red;
confirming a deceleration rate depending on a clutch engagement when the stopping line distance is within the predetermined distance;
determining a stop prediction position based on the deceleration rate; and
controlling a clutch based on the stop prediction position,
wherein determining the stop prediction position comprises:
when the clutch is engaged, determining a first stop prediction position based on a first deceleration rate; and
when the clutch is disengaged, determining a second stop prediction position based on a second deceleration rate.

9. The vehicle driving control method of claim 8, wherein controlling the clutch comprises:
determining whether the first stop prediction position is a first predetermined position; and
engaging the clutch to decelerate a vehicle speed when the first stop prediction position is the first predetermined position,
wherein the first predetermined position is a position that a front portion of the vehicle is on the stopping line or crosses the stopping line.

10. The vehicle driving control method of claim 9, wherein controlling the clutch comprises:
determining whether the second stop prediction position is a second predetermined position when the first stop prediction position is the second predetermined position; and
disengaging the clutch to decelerate the vehicle speed when the second stop prediction position is the second predetermined position,
wherein the second predetermined position is a position that the front portion of the vehicle is not on the stopping line and does not cross the stopping line.

11. The vehicle driving control method of claim 9, wherein controlling the clutch comprises:
determining whether the second stop prediction position is a second predetermined position when the first stop prediction position is the second predetermined position;
disengaging the clutch to decelerate the vehicle speed when the second stop prediction position is the first predetermined position;
determining whether the vehicle reaches the stopping line with the first deceleration rate when the vehicle speed is decelerated; and
engaging the clutch to decelerate the vehicle speed when the vehicle reaches the stopping line with the first deceleration rate.

12. The vehicle driving control method of claim 8, wherein determining the stopping line distance comprises:
receiving road guidance information from a route guidance device; and
determining the stopping line distance based on a vehicle position by using the road guidance information.

13. The vehicle driving control method of claim 8, wherein determining whether the lighting color of the traffic signal light is red comprises:
receiving lighting color information from a traffic information device; and
determining whether the lighting color of the traffic signal light is red based on the lighting color information.

14. The vehicle driving control method of claim 8, wherein determining whether the entry condition is satisfied comprises:
determining whether a position value of an accelerator pedal is a first predetermined value; and
determining whether a position value of a brake pedal is a second predetermined value.

* * * * *